United States Patent [19]

Kulish

[11] Patent Number: 4,605,498

[45] Date of Patent: Aug. 12, 1986

[54] APPARATUS FOR MAGNETIC TREATMENT OF LIQUIDS

[76] Inventor: Peter A. Kulish, 175 West 6th St., Red Hill, Pa. 18076

[21] Appl. No.: 597,549

[22] Filed: Apr. 6, 1984

[51] Int. Cl.$^4$ .............................................. B01D 35/06
[52] U.S. Cl. .................... 210/222; 210/232; 210/695
[58] Field of Search ............... 210/222, 223, 695, 232; 55/100, DIG. 6

[56] References Cited

U.S. PATENT DOCUMENTS

| | | | |
|---|---|---|---|
| 2,652,925 | 9/1953 | Vermeiren | 210/222 |
| 2,939,830 | 6/1960 | Green et al. | 210/222 X |
| 3,228,878 | 1/1966 | Moody | 210/222 X |
| 3,349,354 | 10/1967 | Miyata | 210/222 |
| 4,146,479 | 3/1979 | Brown | 210/222 |
| 4,153,559 | 5/1979 | Sanderson | 210/222 |
| 4,210,535 | 7/1980 | Risk | 210/222 |
| 4,367,143 | 1/1983 | Carpenter | 210/222 |
| 4,372,852 | 2/1983 | Kovacs | 210/222 |

FOREIGN PATENT DOCUMENTS 228518 10/1959 Australia .
1963700 12/1969 Fed. Rep. of Germany ...... 210/222

Primary Examiner—Richard V. Fisher
Assistant Examiner—W. Gary Jones
Attorney, Agent, or Firm—Fidelman, Wolffe & Waldron

[57] ABSTRACT

A method and apparatus is disclosed for magnetic treatment of liquids by concentrating primarily south pole magnetic fields on the liquids to provide descaling and deliming properties thereto.

One embodiment of the invention generally comprises a cylindrical casing of molded plastic or the like for surrounding a pipe through which a liquid is passed. The casing includes plural magnets arranged around the periphery of the pipe in such a manner that their north poles are directed radially outwardly from the central axis of the pipe and their south poles are directed radially inwardly toward the central axis in order to concentrate the south pole magnetic fields more strongly upon the fluid. In an alternate embodiment, the orientation of the poles has been reversed such that the liquid is subjected to predominantly north pole magnetic fields.

9 Claims, 10 Drawing Figures

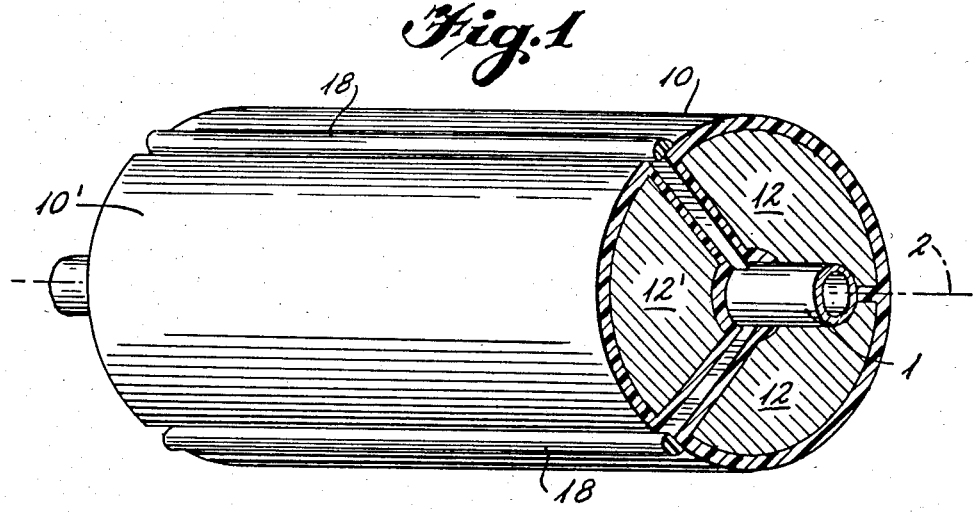
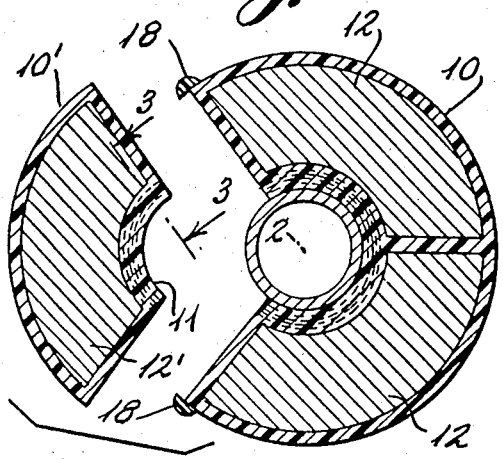
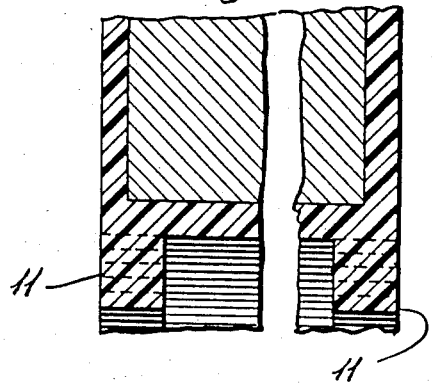
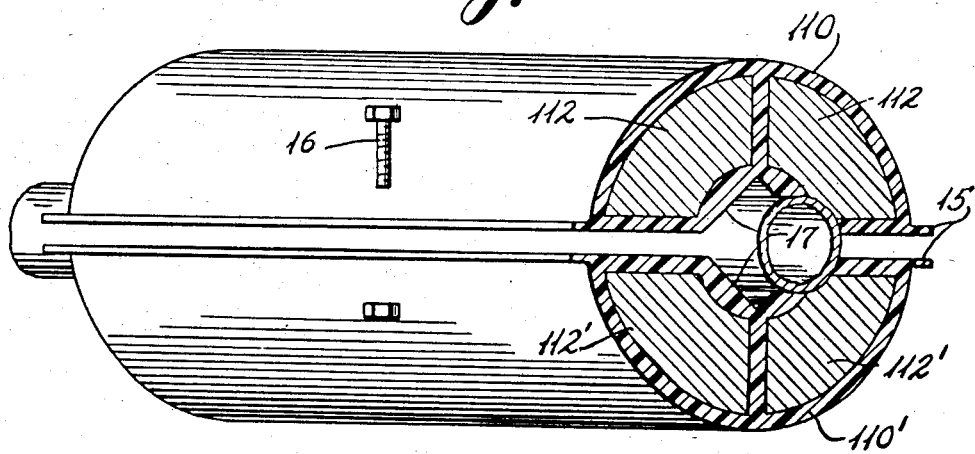

APPARATUS FOR MAGNETIC TREATMENT OF LIQUIDS

CROSS-REFERENCES TO PRIOR ART

Great Britain No. 1,189,888—Chemolimpex Magyar Vegyiaru Kulkereskedelmi Vallalat, METHOD AND APPARATUS FOR THE TREATMENT OF FLUIDS OR SOLUTIONS BY ELECTRIC FIELDS U.S. Pat. No. 2,652,925—T. I. S. Vermeiren, MAGNETIC TREATMENT DEVICE FOR LIQUIDS U.S. Pat. No. 2,939,830—W. G. Green, et al., WATER CONDITIONER U.S. Pat. No. 3,228,878—D. L. Moody, METHOD AND APPARATUS FOR TREATMENT OF FLOWING LIQUIDS TO CONTROL DEPOSITION OF SOLID MATTER THEREFROM U.S. Pat. No. 4,146,479—Merritt J. Brown, MAGNETIC WATER CONDITIONER U.S. Pat. No. 4,153,559—Charles H. Sanderson, WATER TREATMENT DEVICE AND METHOD FOR MANUFACTURING SAME U.S. Pat. No. 4,210,535—George Risk, MAGNETIC TREATMENT DEVICES FOR WATER PIPELINES

BACKGROUND AND SUMMARY OF THE INVENTION

This invention relates to a method and apparatus for magnetic treatment of fluids, particularly liquids.

A considerable amount of study and development has been conducted over the last 35 years or so, indicating empirically that magnetically treated liquids, such as water, contribute effectively to the prevention, loosening, and removal of crust and scale from the inner surfaces of metal conduits, tanks, sewage systems, and the like. It has been found that exposure of liquids to predominantly south pole magnetic fields are particularly effective in reducing crust and scale buildup on conduit walls. Prior art devices for accomplishing this liquid treatment have used horseshoe and bar magnets or the like in which both the north and south poles of the magnets are adjacent the pipe through which the fluids flow such that one of the magnetic pole energies are predominant on the upstream side of the device and the other magnetic pole energies are predominant on the downstream side of the device. The above-referenced U.S. Pat. No. 2,652,925 to Vermeiren discloses ring- or donut-shaped magnets arranged around a pipe through which a liquid flows with one pole of each magnet on the upstream side of the device and the opposite pole on the downstream side of the device.

It is an object of the instant invention to magnetically treat liquids in a more efficient and economical manner than has been done previously.

It is a further object of the invention to magnetically treat liquids by exposing them to a predominantly south pole oriented field in order to impart properties to the liquid which effectively contribute to descaling and the like.

It is a further object of the invention to magnetically treat potable liquids, such as wines, by passing them through magnetically oriented fields which are either predominantly north pole or predominantly south pole fields for the purpose of changing the taste of the liquid.

One embodiment of the instant invention generally comprises a cylindrical casing of molded plastic or the like for surrounding a pipe through which a liquid is passed. The casing includes plural magnets arranged around the periphery of the pipe in such a manner that their north poles are directed radially outwardly from the central axis of the pipe and their south poles are directed radially inwardly toward the central axis in order to concentrate the south pole magnetic fields more strongly upon the fluid. In an alternate embodiment, the orientation of the poles has been reversed such that the liquid is subjected to predominantly north pole magnetic fields.

BRIEF DESCRIPTION OF THE DRAWINGS

FIG. 1 is an isometric view of one embodiment of the instant invention.

FIG. 2 is a cross-sectional view of the device of FIG. 1, with a section of the device removed from the pipe to illustrate the manner of connection thereto.

FIG. 3 is a partial cross-sectional view, along the lines 3—3 of FIG. 2, illustrating perforated tabs for adaptation of the device to pipes of different diameters.

FIG. 4 is an isometric view of an alternative embodiment of the instant invention.

DETAILED DESCRIPTION OF THE INVENTION

Figure 5:
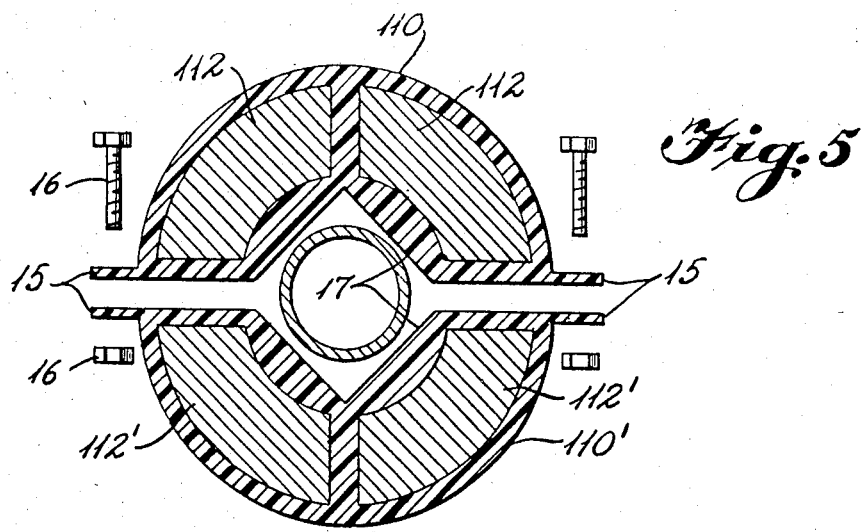
FIG. 5 is a cross-sectional view of the device of FIG. 4.

Throughout the various drawings, like numbers have been used for like functional members.

Referring to FIGS. 1-3, a casing is comprised of sections 10, 10' in which are encased arcuate sector magnets 12, 12'. The casing is preferably formed of a molded plastic, such as polyvinylchloride (PVC), and the arcuate sector magnets are magnetically oriented in a radial direction with the south magnetic pole located at the internal radius thereof and the north pole located at the external radius thereof. As best seen in FIG. 2, the major section 10 of the device surrounds substantially 270° of the circumference of the pipe 1 with the cooperating section 10' attachable, by a snap fit with lips 18, to totally surround the pipe 1.

Perforated end tabs 11 are provided, as best seen in FIG. 3, with portions of tabs 11 removable along the lines of perforation to adapt the device to pipes of various diameters.

Referring to FIGS. 4 and 5, generally hemispherical casing sections 110, 110' are used in much the same way as the embodiment of FIGS. 1-3. However, flanges 15 and nuts and bolts 16 are provided for connecting the two sections 110 and 110' together, and generally V-shaped pipe engaging portions 17 are provided in order that the sections may be mounted on pipes of varying diameters.

Figure 6:
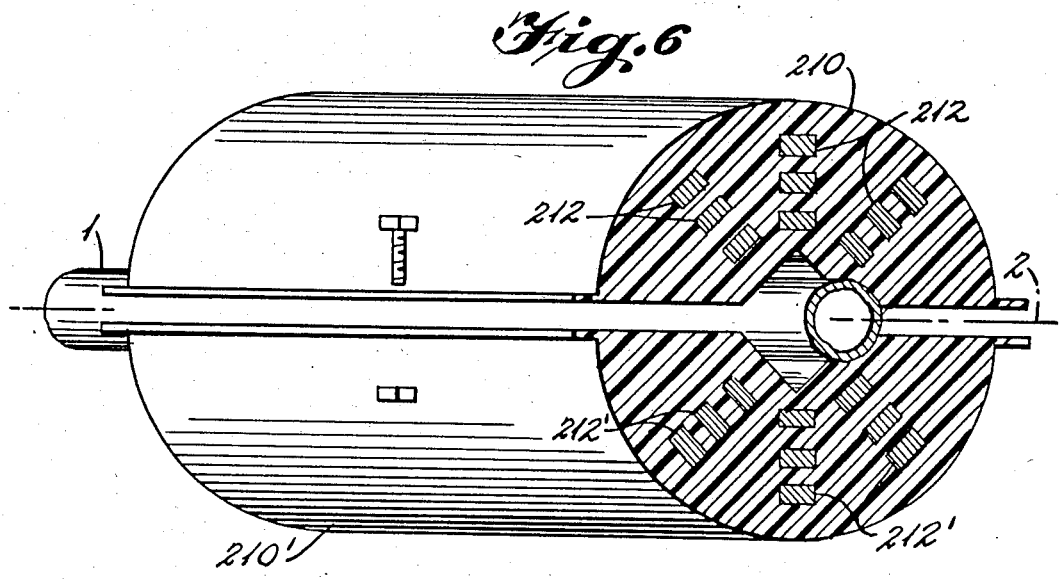
FIG. 6 is an isometric view of another embodiment of the instant invention.
Figure 7:
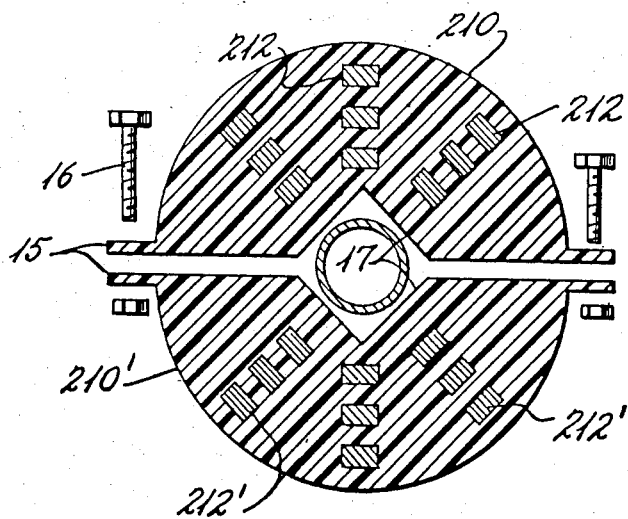
FIG. 7 is a cross-sectional view of the embodiment of FIG. 6.

FIGS. 6 and 7 illustrate an alternative embodiment in which sections 210, 210' encase bar magnets 212, 212' having their longitudinal axes generally parallel to the central axis 2 of pipe 1. Each bar magnet is magnetically and physically oriented such that the south pole magnetic fields are directed radially inward toward central axis 2 and the north pole magnetic fields are directed generally radially outwardly from central axis 2. By radially stacking bar magnets 212, 212′, as illustrated in FIGS. 6 and 7, the magnetic fields are increased in a cumulative manner. According to the magnetic strength of each bar magnet, each radial stack may comprise one or more magnets. Although FIGS. 6 and 7 illustrate the bar magnets as being separated by the plastic casing material, it is contemplated that the magnets of a stack may be in physical contact with each other.

Figure 8:
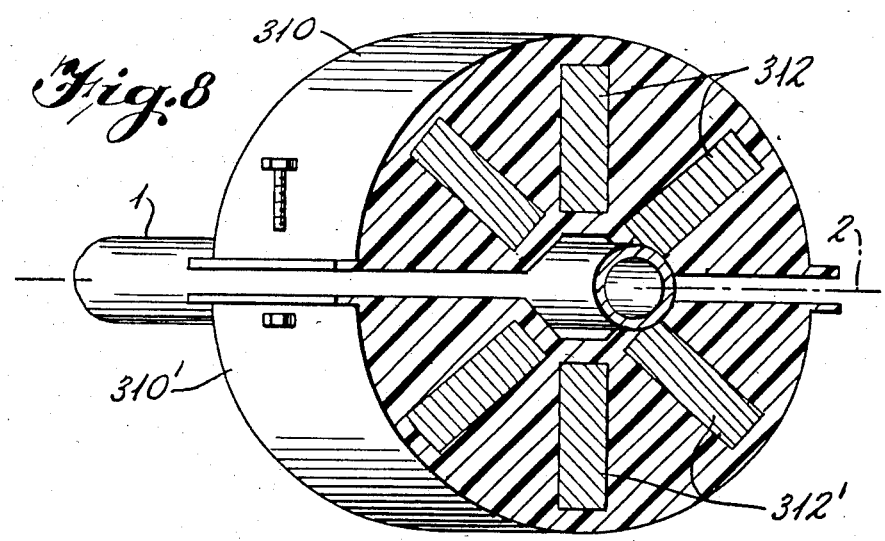
FIG. 8 is an isometric view of still another embodiment of the instant invention.

In the additional embodiment of FIG. 8, sections 310, 310′ have bar magnets 312, 312′ contained therein such that the longitudinal axes of bar magnets 312, 312′ are perpendicular to central axis 2. Bar magnets 312, 312′ are also magnetically and physically oriented such that the south pole magnetic fields are directed radially inwardly and the north pole magnetic fields are directed radially outwardly.

Figure 9:
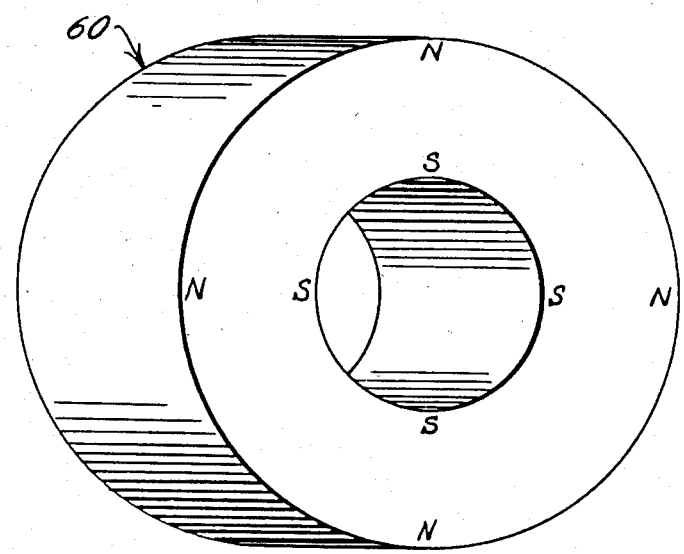
FIGS. 9 and 10 are isometric views for illustration of additional alternate embodiments of the instant invention.
Figure 10:
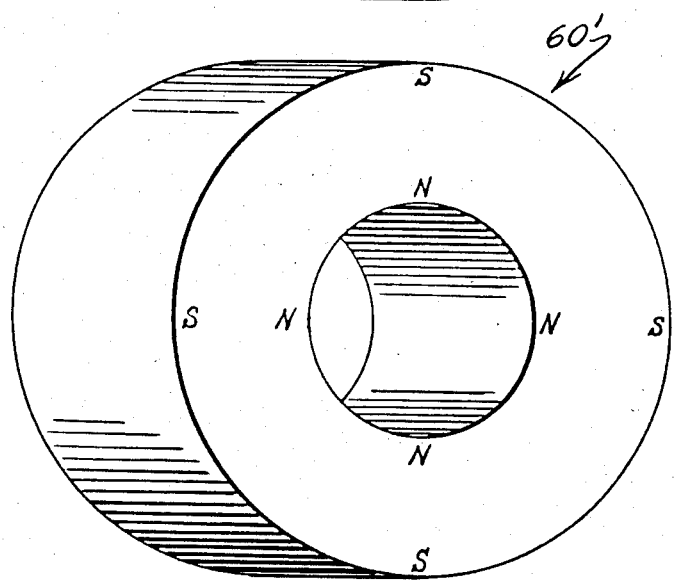

FIGS. 9 and 10 disclose generally cylindrical or donut-shaped magnets 60, 60′ having one pole at the outer periphery thereof and the opposite pole at the inner periphery thereof. In FIG. 9, the south pole is disposed at the inner periphery and the north pole is disposed at the outer periphery. Cylindrical magnet 60′, of FIG. 10, discloses the south pole at the outer periphery thereof and the north pole at the inner periphery thereof. It has been found empirically that magnets 60, 60′ noticeably change the taste of liquids passed through the centers thereof, with the preference for the taste depending upon the individual taster. Although disclosed as a unitary magnet in FIGS. 9 and 10, it is contemplated that these magnets 60, 60′ could be sectional, as illustrated in the earlier embodiments.

Arcuate sector magnets illustrated in several of the embodiments are readily available as ceramic permanent magents of specified strengths, ranging from M1–M8, such as those produced by the Magnetics Division of ALLEN-BRADLEY of Milwaukee, Wis. Other types of magnets which may be used include those commonly referred to as alnico (a combination of aluminum, nickel, and cobalt), as well as cerium magnets. The bar magnets may also be alnico, cerium, or ceramic ferrite.

It will thus be seen that the objects set forth above, among those made apparent from the preceding description, are efficiently attained and, since certain changes may be made in carrying out the above method and in the construction set forth without departing from the scope of the invention, it is intended that all matter contained in the above description or shown in the accompanying drawings shall be interpreted as illustrative and not in a limiting sense. Various modifications may be incorporated in the structure without departing from the scope of the invention, namely, the casing may be provided with pockets into which the magnets may be received.

It is also to be understood that the following claims are intended to cover all of the generic and specific features of the invention herein described and all statements of the scope of the invention which, as a matter of language, might be said to fall therebetween.

What is claimed as new and desired to be secured by letters patent is:

1. An apparatus for magnetic treatment of potable liquids, and comprising:
    magnetic means for providing north and south magnetic fields and concentrating predominantly only one of said magnetic fields on a central axis to provide magnetic treatment of a liquid located generally along said central axis and substantially within said one magnetic field; and
    a casing surrounding said magnetic means for holding said magnetic means onto a conduit through which said liquid flows, said casing defining an internal diameter means for mating with different diameters of said conduit according to removal of portions of said internal diameter means.
2. An apparatus as in claim 1, wherein said magnetic means comprises:
    plural bar magnets arranged about said central axis, each of said bar magnets having a north pole and a south pole with said south pole directed generally radially toward said central axis and said north pole directed generally away from said central axis.
3. An apparatus as in claim 1, wherein said magnetic means comprises:
    plural magnets each in the form of arcuate sectors having an internal radius and an external radius and being magnetically oriented radially to provide a south pole at said internal radius and a north pole at said external radius;
    said magnets arranged about said central axis with said south poles directed inwardly toward said axis and said north poles directed outwardly from said axis.
4. An apparatus as in claim 1, wherein said magnetic means comprises:
    a cylindrical magnet having an internal and an external diameter and a cylinder axis, a magnetic pole at one of said diameters and an opposing magnetic pole at the other of said diameters, said cylinder axis being centered generally upon said central axis.
5. An apparatus as in claim 4, wherein said cylindrical magnet comprises:
    a south pole at said internal diameter and a north pole at said external diameter.
6. An apparatus as in claim 4, wherein said cylindrical magnet comprises:
    a north pole at said internal diameter and a south pole at said external diameter.
7. An apparatus as in claim 1, wherein said magnetic means comprises:
    plural bar magnets arranged about said central axis, each of said bar magnets having a longitudinal axis substantially parallel to said central axis, and north and south magnetic poles substantially perpendicular to said central axis, one of said poles directed generally toward said central axis, and the other of said poles directed generally away from said central axis.
8. An apparatus as in claim 7, wherein said south pole of each of said bar magnets is directed generally toward said central axis.
9. An apparatus as in claim 1, and comprising:
    said casing being subdivided to provide a main portion and a segment portion and having means to snap fit said segment portion to said main portion to accomplish said attaching.

* * * * *